Figure 1:
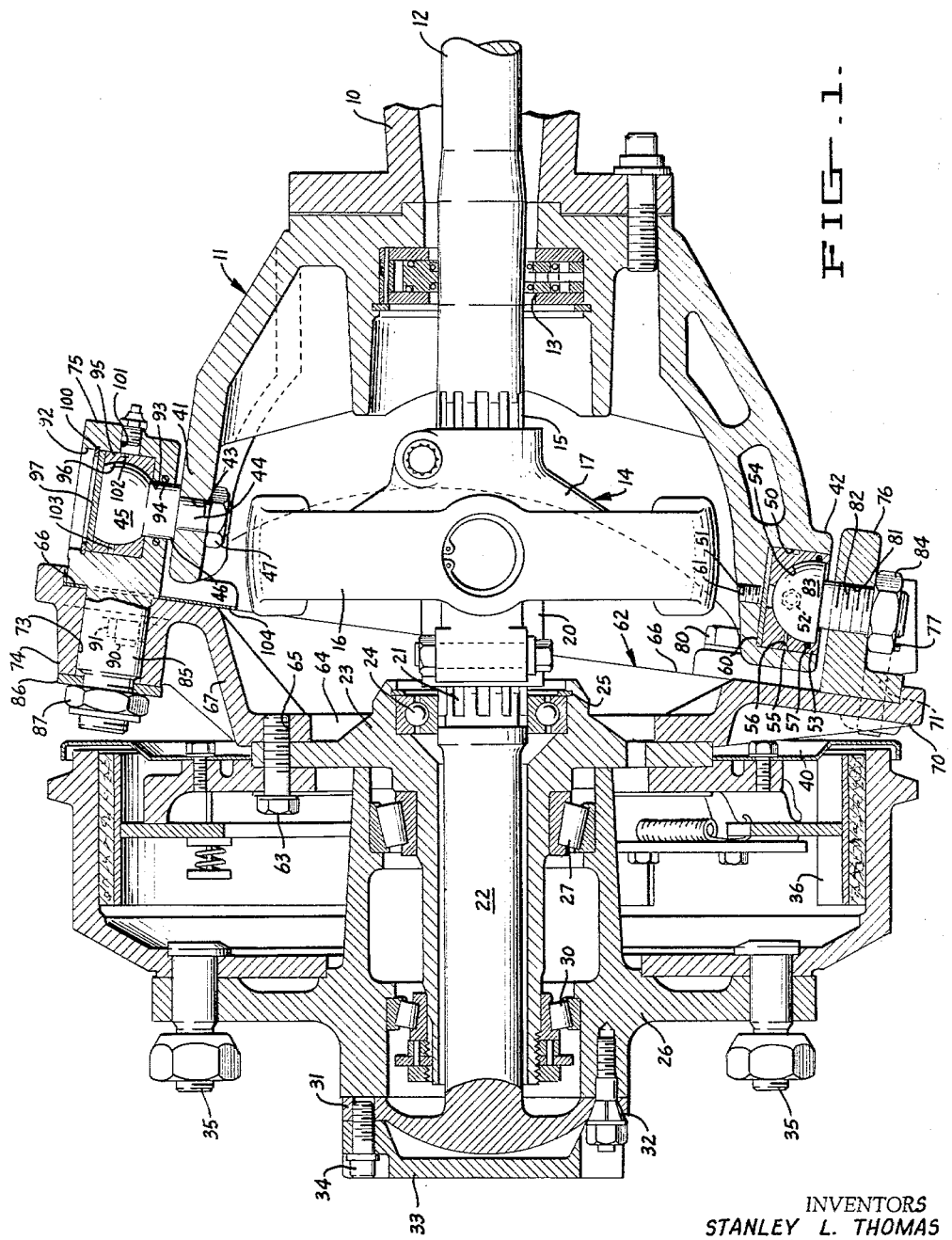

May 31, 1966  S. L. THOMAS ETAL  3,253,670
STEERING DRIVE AXLE ASSEMBLY

Filed May 4, 1964  2 Sheets-Sheet 2

INVENTORS
STANLEY L. THOMAS
TERRENCE M. SMITH
BY Naylor & Neal
ATTORNEYS

United States Patent Office 3,253,670
Patented May 31, 1966

3,253,670
STEERING DRIVE AXLE ASSEMBLY
Stanley L. Thomas and Terence M. Smith, Concord, Calif., assignors to Fabco Manufacturing Company, Concord, Calif., a corporation of California
Filed May 4, 1964, Ser. No. 364,742
6 Claims. (Cl. 180—43)

This invention relates to a steering drive axle assembly and is more particularly directed to such an assembly provided with an improved trunnion arrangement to facilitate turning of the vehicle on which the assembly is used. The invention is especially useful to support the steerable wheels of a four-wheel drive vahicle.

Steering drive axles similar to that of the instant invention are well known, as is exemplified by United States Patents 2,781,211 and 2,871,965, to name a few. In the type of assembly illustrated by these patents, the drive axle housing and the wheel hub are typically joined to facilitate steering through means of a kingpin assembly and the driver and driven axles are joined by a universal-type joint. The kingpin assemblies of these devices generally include cylindrical pin elements disposed in vertically spaced relationship and received in tubular bearing elements, such as sleeves or ball bearings, to carry radial loads. To carry vertical loads imparted to the kingpin assembly, the lower pin is provided with a thrust bearing.

Prior art devices of the type described above have the disadvantage that pivotal movement about the kingpins is limited to a single plane and that, therefore, adjustment of the camber angle of the steering assembly cannot be effected by varying this plane relative to the kingpin axis. These devices have the added disadvantage that vertical loads are carried only by the lower kingpin. Thus, loads are not uniformly carried by the kingpin assembly and the assembly is unbalanced from a structural standpoint and prone to wear unevenly. In the latter respect, it is noted that in today's kingpin assemblies using kingpins of either the ball or cylinder type, the lower vertical load-carrying pin typically fails before the upper pin.

Accordingly, it is the principal object of this invention to provide a steering drive axle wherein the camber angle may be readily adjusted by adjusting the plane in which the wheel turns with respect to the kingpin axis.

It is another object of this inventon to provide a steering drive axle wherein vertical loads imparted to the kingpin assembly are balanced between the upper and lower kingpins.

It is yet another object of the invention to provide a steering drive axle assembly having structural elements of adequate strength and minimum weight which may be fabricated relatively inexpensively.

Broadly stated, the invention is intended for use in the environment of a steering drive axle assembly having a driver axle rotatably supported in an axle housing, a driven axle rotatably supported in a wheel hub in outboard and spaced relation to said driver axle and in axial alignment therewith, a Cardan-type universal joint connecting said axles together and including an improved means for mounting the driven axle for horizontal movement with respect to the driver axle. The improved means comprises a suspension yoke secured to said axle housing and having end elements extending above and below the universal joint. A pair of ball and socket kingpins are secured to the end elements of said yoke and disposed on an axis offset from the vertical. Connection between the kingpins and the wheel hub is faciliated by a rigid plate disposed therebetween and fixedly secured on one side to the hub. A pair of mounting brackets protrude from the other side of the plate and are adapted to be secured to the kingpins, and means is provided on at least one of said brackets to adjust the distance between the kingpins secured thereto and the plate.

Figure 2:
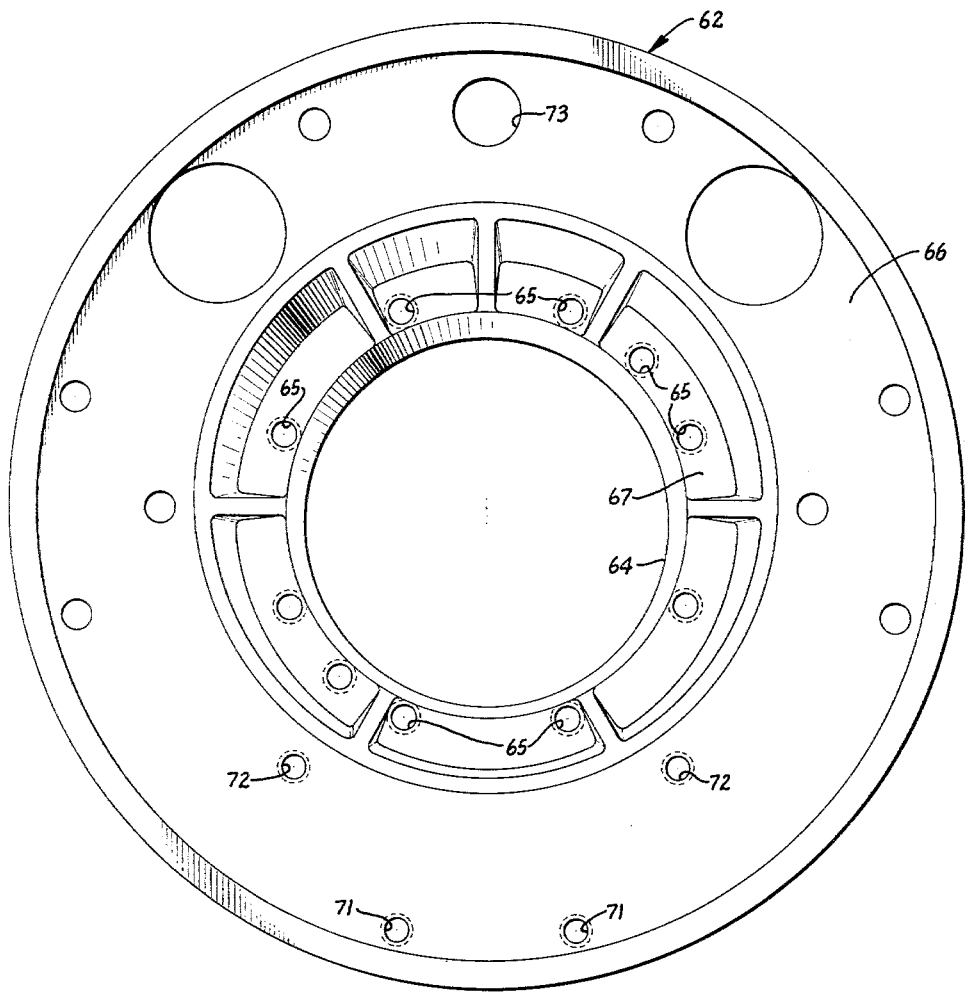

The foregoing objects and the details of the invention will become more apparent when viewed in light of the accompanying drawings, in which:

FIG. 1 is a view in vertical diametrical section of one end of the subject steering drive axle; and FIG. 2 is a side view in plan of the right hand side of the adapter plate of FIG. 1 which forms an important element of the assembly.

Referring now in detail to FIG. 1, an axle housing 10 is shown therein secured to a suspension yoke 11, through both of which rotatably passes a driver axle 12. Although not illustrated, it is to be understood that the axle housing 10 and axle 12, respectively, extend into engagement with a differential housing and drive gear arrangement of conventional character. The driver axle 12 extends sealingly through the yoke 11 through means of an annular seal 13 received in the yoke. The end of the axle 12 extending through the yoke is connected to a Cardan-type universal joint 14 through means of a spline 15 on the axle. Preferably, the universal joint 14 is of the type shown in United States Patent 2,952,144 and includes a compensating ring 16 having torque bars 17 and 20 journaled therein at right angles with respect to each other. The torque bars 17 and 20 are provided with spline receiving sockets adapted to clampingly engage the spline 15 of the drive axle 12 and a spline 21 formed on the end of a driven axle 22 to which torque from the driver axle 12 is imparted through the universal joint 14.

The driven axle 22 is rotatably carried in a wheel hub 23 by a ball bearing 24 interposed between the hub and the axle 22 and retained within the hub by a snap-ring 25. The wheel hub 23 has a wheel receiving brake drum assembly 26 rotatably mounted thereon by roller bearings 27 and 30. The driven axle 22 drivingly engages the brake drum assembly 26 through means of a driving flange 31 formed thereon and bolted to the brake drum assembly by studs 32. As illustrated, the flange 31 is covered by a hubcap 33 secured thereto by a screw 34. The brake drum assembly 26 also is provided with conventional structure including wheel mounting studs 35 and brake shoes 36 received within a drum section of the assembly. The inner end of the drum section is closed by a stationary dust plate 40 carried by the wheel hub 23.

Referring now to the kingpin assembly to which the present invention is primarily directed, this assembly includes the aforementioned dish-shaped suspension yoke 11 from the upper and lower ends of which extend kingpin receiving elements 41 and 42, respectively. The element 41 has formed therein an aperture 43 in which is fixedly received the mounting shank 44 of the upper ball-type kingpin 45. The mounting shank 44 is fixedly held within the aperture 43 by a shoulder 46 formed on the kingpin and a nut 47 threadedly received on the lower end of the shank.

The lower kingpin receiving element 42 has formed therein an open cavity 50, a threaded setscrew passage 51 and grease passage 52. A ball socket or race 53, having a spherical recess 54 opening through one side thereof, is snugly received within the cavity 50 in a position wherein the recess faces the open side of the cavity. The socket 53 has an annular groove 55 formed around the outer periphery thereof at a level wherein it will align with the grease passage 52 when the socket is disposed in the cavity 50. Passages 56 extend through the socket 53 between the groove 55 and the recess 54 in order to communicate grease to said recess. The spherical recess 54 also has formed therein an annular recess adapted to receive an O-ring 57. Vertical positioning of the ball socket 53 in the cavity 50 is controlled through means of a backing plate 60 slidably received within the cavity 50 above the ball socket and adapted to be positioned by a setscrew 61 threaded into the passage 51.

The kingpin assembly further includes an adapter plate 62 positioned between the suspension yoke 11 and wheel hub 23 and fixedly secured to the latter element by bolts 63. The adapter plate 62 is illustrated in assembled condition in FIG. 1 and in disassembled plan view in FIG. 2. As can be seen in FIG. 1, the plate 62 is of relatively flat form with the upper end thereof being slightly thicker than the lower end. The plate has formed therein a relatively large circular opening 64 at its center in a position wherein the center portion of the wheel hub 23 extends therethrough when the hub and adapter plate are secured together. Disposed around the opening 64 are threaded bolt holes 65 adapted to receive the bolts 63. The outer periphery of the adapter plate 62 is formed as an annular surface 66 spaced horizontally (as viewed in FIG. 1) from the section of the plate in which the bolt holes 65 are formed by a web reinforced section 67. The adapter plate 62 is also formed with an annular flange 70 around the outer extremity of its periphery, pairs of threaded bolt holes 71 and 72 through the lower portion of the surface 66 and a relatively large cylindrical hole 73 through the upper portion of said surface. The latter opening is provided with a reinforcing collar 74 which acts as a continuation thereof and extends from the side of the plate opposite the surface 66.

Referring now to the manner in which the adapter plate 62, together with the kingpins carried by the suspension yoke 11, functions to journal the wheel hub 23 for steering movement with respect to the suspension yoke, this function is completed by a pair of upper and lower mounting brackets 75 and 76, respectively, adapted to operatively connect the adapter plate with the kingpins carried by the suspension yoke. The lower mounting bracket 76 is fixedly secured to the plate 62 by pairs of bolts 77 and 80 extending through openings provided therefor in the bracket and into threaded engagement with the bolt holes 71 and 72, respectively. The end of the bracket 76 extending away from the adapter plate 62 is positioned approximately parallel to the lower kingpin receiving element 42 and has extending therethrough a threaded kingpin hole 81. The hole 81 threadedly receives a mounting shank 82 of a ball-type kingpin 83 having the spherical or ball-shaped head portion thereof journaled in the ball socket 53. Seating of the head portion of the kingpin in the ball socket may be adjusted by varying the degree to which the shank 82 is threaded into the opening 81 and once adjusted the shank may be locked in position by means of a locknut 84 received on the lower end thereof.

The upper mounting bracket 75 is secured to the adapter plate 62 through means of a mounting shank formed integrally with the bracket and extending through the cylindrical hole 73. The shank 85 is held in the position illustrated in FIG. 1 by a washer 86 received therearound and a nut 87 threadedly received on the end of the shank extending through the adapter plate. In order to assure that the mounting bracket 75 will not turn about the axis of the shank 85, a bolt 90 is preferably passed through aligned openings (not illustrated) in the bracket and adapter plate. The head of the bolt 90 (not illustrated) seats against the mounting bracket and the end of the bolt extending through the adapter plate has received thereon a nut 91.

As assembled in FIG. 1, the mounting bracket 75 extends over the upper kingpin receiving element 41 in a position substantially parallel thereto. In this condition the kingpin 45 is journaled in the mounting bracket 75 through provision provided therefor similar to the aforedescribed ball receiving socket 53 for the kingpin 83. This provision comprises a cavity 92 formed in the upper side of the mounting bracket 75 and an opening 93 extending through the lower side of the bracket into communication with the cavity. It is noted that the opening 93 is sufficiently large to loosely receive the shank 44 of the kingpin 45 and that an O-ring 94 is received in the opening 93 so as to sealingly engage the shank. In the assembled condition illustrated in FIG. 1, a ball socket or race 95 having a spherical recess 96 formed therein is snugly received in the cavity 92 in a position wherein the recess rotatably and slidably engages the spherical or ball-shaped head of the kingpin 45. The socket 95 is held in place by a retainer plate 97 positioned thereabove in the cavity 92, which plate is in turn held in place by a snap-ring 100 engaged in the cavity. Lubrication of the socket 95 is facilitated through an arrangement similar to that used for the socket 53, which arrangement includes a grease passage 101 extending through the sidewall of the bracket 75 and communicating with an annular groove 102 formed around the outer periphery of the socket. Grease passages 103 extend through the walls of the socket 95 and communicate the annular groove 102 with the spherical recess 96.

At this point it is noted that the spherical recess 96 in the ball socket 95 extends around the ball-shaped end of the kingpin 45 to a degree sufficient to transmit vertical forces applied to the kingpin in either upward or downward direction to the mounting bracket 75. The latter characteristic results from the fact that both the ball-shaped end of the kingpin 45 and the spherical recess of the ball socket 96 extend above and below a diametrical line passing normal to the axis of the ball. Thus, one of the prime advantages of the instant invention results, namely, vertical forces applied to the suspension yoke 11 as the result of upward forces imparted to the wheel hub 23 or downward forces imparted to the axle housing 10 are carried by both the kingpins 45 and 83. The load carrying capacity of the kingpin 83 is believed obvious upon observation of FIG. 1, since the kingpin extends upwardly from an element which is fixedly secured to the wheel hub into a socket which is fixedly secured to the axle housing.

The aforesaid structure of the instant invention and particularly the kingpin arrangement thereof, has the added advantage that it facilitates the ready adjustment of the camber angle of a wheel secured too the brake drum assembly 26. Camber angle is the angle at which a line passing normal to the wheel axis departs from the vertical. Control of this angle is critical since it must be maintained within predetermined limits to assure uniform tire wear.

In the illustrated structure, camber angle adjustment may be accomplished by increasing the distance between the upper mounting bracket 75 and the adapter plate 62 while maintaining the lower mounting bracket 76 and the adapter plate 62 in fixed relationship. This adjustment is possible because the ball joint type kingpins are free to pivot about the center points of the respective balls. It is believed apparent that this type of adjustment could not be accomplished with cylindrical type kingpins, since such pivotal movement would not be possible. The distance between the mounting bracket 75 and the adapter plate 62 is adjusted by inserting a shim 104 between these respective elements. The present invention is not, however, intended to be limited to this shim type of adjustment since other means, such as threaded connections, could be used to adjust the distance between the mounting bracket 75 and the adapter plate 62. It is noted that the camber angle adjustment could also be accomplished by adjusting the distance between the lower mounting bracket 76 and the adapter plate 62 while maintaining the upper mounting bracket 75 stationary with respect to the adapter plate, or by adjusting the distances between both the upper and lower mounting brackets and the adapter plate.

To conclude with even more advantages derived from the present invention, attention is directed to the relatively flat construction of the adapter plate 62 and the relatively balanced structure of the upper and lower portions of the suspension yoke 11. The flat structure of the adapter plate has the advantage that the surfaces thereof which require finishing may be machined with a minimum number of steps, and that, thus, the time and expense required for such finishing is also minimized. The relatively balanced structure of the upper and lower portions of the suspension yoke 11 is advantageous since it minimizes the bulk of the yoke and, thus, its weight. It is noted that the balanced yoke structure results from the fact that both the upper and lower kingpins carry vertical load. The latter characteristic has the added advantage that wear on the kingpins and their associated structure is balanced and, accordingly, the total life of the entire kingpin assembly is maximized. Furthermore, because of the balanced structure of the yoke 11, the portions thereof extending above and below the universal joint 14 are adapted to deflect uniformly when shock forces are applied to the axle housing or wheel hub, thus minimizing concentrated strains on the entire kingpin assembly.

While a particular embodiment of the invention has been illustrated herein, the invention includes the equivalent of the features herein described and is, accordingly, limited only to the express requirements of the following claims.

What is claimed is:

1. In the environment of a steering drive axle assembly having a driver axle rotatably supported in an axle housing, a driven axle rotatably supported in a wheel hub in outboard and spaced relation to said driver axle and in axial alignment therewith, a Cardan-type universal joint connecting said axles together, and including an improved means for mounting said driven axle for horizontal movement with respect to said driver axle, said improved means comprising:
   (a) a suspension yoke fixed to said axle housing and having end elements extending above and below the universal joint;
   (b) a pair of ball and socket kingpins secured to the end elements of said yoke, said kingpins being disposed on an axis offset from the vertical;
   (c) a rigid plate disposed between said yoke and the wheel hub and fixedly secured on one side to said hub;
   (d) a pair of mounting brackets protruding from the other side of said plate and adapted to be secured to said kingpins; and,
   (e) means on at least one of said mounting brackets to adjust the distance between the kingpin secured thereto and the plate.

2. A device according to claim 1 wherein each of the kingpins is adapted to carry vertical loads applied to the suspension yoke as the result of upward forces imparted to the wheel hub or downward forces imparted to the axle housing.

3. A device according to claim 1 wherein the elements of the suspension yoke extending above and below the universal joint are adapted to deflect uniformly when shock forces are applied to the axle housing or wheel hub.

4. A device according to claim 1 wherein the plate is fabricated as a substantially flat annular member.

5. A device according to claim 1 wherein the means is on the mounting bracket adapted to be secured to the kingpin on the suspension yoke element extending above the universal joint and comprises a stud fixed thereto and adapted to secure said bracket in spaced relationship to the plate.

6. In the environment of a steering drive axle assembly having a driver axle rotatably supported in an axle housing, a driven axle rotatably supported in a wheel hub in outboard and spaced relation to said driver axle and in axial alignment therewith, a Cardan-type universal joint connecting said axles together, and including an improved means for mounting said driven axle for horizontal movement with respect to said driver axle, said improved means comprising:
   (a) a suspension yoke fixed to said axle housing and having end elements extending above and below the universal joint;
   (b) a pair of ball and socket kingpins secured to the end elements of said yoke, said kingpins being disposed on an axis offset from the vertical;
   (c) a rigid plate disposed between said yoke and the wheel hub and fixedly secured on one side to said hub;
   (d) a pair of mounting brackets protruding from the other side of said plate and adapted to be secured to said kingpins, and
   (e) means operatively associated with at least one of said mounting brackets to adjust the distance between the kingpin secured thereto and the plate.

References Cited by the Examiner
UNITED STATES PATENTS

| | | |
|---|---|---|
| 2,071,714 | 2/1937 | Van Ranst. |
| 2,075,564 | 3/1937 | Alden _____ 180—43 |
| 2,085,738 | 7/1937 | Coleman. |
| 2,421,007 | 5/1947 | Buckendale _____ 180—43 X |
| 2,599,013 | 6/1952 | Pringle. |
| 2,781,211 | 2/1957 | Holmes _____ 287—20 |
| 2,871,965 | 2/1959 | Ainsworth _____ 180—43 |
| 2,952,144 | 9/1960 | Holmes. |
| 2,998,262 | 8/1961 | Hoffman _____ 287—90 X |
| 3,074,736 | 1/1963 | Krizman _____ 287—90 X |
| 3,075,600 | 1/1963 | Ordorica et al. _____ 180—43 |

KENNETH H. BETTS, *Primary Examiner.*